US008236198B2

(12) United States Patent
Birau et al.

(10) Patent No.: US 8,236,198 B2
(45) Date of Patent: *Aug. 7, 2012

(54) FLUORESCENT NANOSCALE PARTICLES

(75) Inventors: Maria M. Birau, Mississauga (CA);
Gabriel Iftime, Mississauga (CA);
Sandra J. Gardner, Oakville (CA);
Paul F. Smith, Oakville (CA); Peter M. Kazmaier, Mississauga (CA); Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 832 days.

This patent is subject to a terminal disclaimer.

(21) Appl. No.: 12/246,120

(22) Filed: Oct. 6, 2008

(65) Prior Publication Data
US 2010/0083869 A1   Apr. 8, 2010

(51) Int. Cl.
*C09K 11/06* (2006.01)
*C09D 11/00* (2006.01)
(52) U.S. Cl. .................. 252/301.16; 106/31.32
(58) Field of Classification Search ............. 252/301.16, 252/301.33, 301.34, 301.35; 106/31.14, 106/31.32, 31.64
See application file for complete search history.

(56) References Cited

U.S. PATENT DOCUMENTS

| | | | |
|---|---|---|---|
| 2,809,954 A | 10/1957 | Kazenas | |
| 2,938,873 A | 5/1960 | Kazenas | |
| 3,455,856 A | 7/1969 | Voedisch et al. | |
| 3,590,000 A | 6/1971 | Palermiti et al. | |
| 3,642,650 A | 2/1972 | McIntosh | |
| 3,800,588 A | 4/1974 | Larson et al. | |
| 3,847,604 A | 11/1974 | Hagenbach et al. | |
| 3,944,493 A | 3/1976 | Jadwin et al. | |
| 4,007,293 A | 2/1977 | Mincer et al. | |
| 4,079,014 A | 3/1978 | Burness et al. | |
| 4,291,111 A | 9/1981 | Lu | |
| 4,338,390 A | 7/1982 | Lu | |
| 4,394,430 A | 7/1983 | Jadwin et al. | |
| 4,560,635 A | 12/1985 | Hoffend et al. | |
| 4,714,682 A | 12/1987 | Schwartz | |
| 4,830,671 A | 5/1989 | Frihart et al. | |
| 4,889,560 A | 12/1989 | Jaeger et al. | |
| 4,889,761 A | 12/1989 | Titterington et al. | |
| 4,935,326 A | 6/1990 | Creatura et al. | |
| 4,937,166 A | 6/1990 | Creatura et al. | |
| 4,975,220 A | 12/1990 | Streitel et al. | |
| 5,073,498 A | 12/1991 | Schwartz et al. | |
| 5,093,147 A | 3/1992 | Andrus et al. | |
| 5,094,777 A | 3/1992 | DiPietro | |
| 5,194,638 A | 3/1993 | Frihart et al. | |
| 5,221,335 A | 6/1993 | Williams et al. | |
| 5,264,153 A | 11/1993 | De Krom | |
| 5,278,020 A | 1/1994 | Grushkin et al. | |
| 5,290,664 A | 3/1994 | Matsumoto | |
| 5,294,664 A | 3/1994 | Morrison, Jr. et al. | |
| 5,308,734 A | 5/1994 | Sacripante et al. | |
| 5,344,738 A | 9/1994 | Kmiecik-Lawrynowicz et al. | |
| 5,346,797 A | 9/1994 | Kmiecik-Lawrynowicz et al. | |
| 5,348,832 A | 9/1994 | Sacripante et al. | |
| 5,364,729 A | 11/1994 | Kmiecik-Lawrynowicz et al. | |
| 5,366,841 A | 11/1994 | Patel et al. | |
| 5,370,963 A | 12/1994 | Patel et al. | |
| 5,372,852 A | 12/1994 | Titterington et al. | |
| 5,403,693 A | 4/1995 | Patel et al. | |
| 5,405,728 A | 4/1995 | Hopper et al. | |
| 5,418,108 A | 5/1995 | Kmiecik-Lawrynowicz et al. | |
| 5,435,937 A | 7/1995 | Bell et al. | |
| 5,439,971 A | 8/1995 | Hyche | |
| 5,496,676 A | 3/1996 | Croucher et al. | |
| 5,501,935 A | 3/1996 | Patel et al. | |
| 5,527,658 A | 6/1996 | Hopper et al. | |
| 5,529,876 A | 6/1996 | Sasaki et al. | |
| 5,554,480 A | 9/1996 | Patel et al. | |
| 5,585,215 A | 12/1996 | Ong et al. | |
| 5,593,807 A | 1/1997 | Sacripante et al. | |
| 5,597,856 A | 1/1997 | Yu et al. | |
| 5,621,022 A | 4/1997 | Jaeger et al. | |
| 5,650,255 A | 7/1997 | Ng et al. | |
| 5,650,256 A | 7/1997 | Veregin et al. | |
| 5,679,138 A | 10/1997 | Bishop et al. | |
| 5,723,253 A | 3/1998 | Higashino et al. | |
| 5,728,797 A | 3/1998 | O'Dell et al. | |
| 5,744,520 A | 4/1998 | Kmiecik-Lawrynowicz et al. | |
| 5,747,215 A | 5/1998 | Ong et al. | |
| 5,763,133 A | 6/1998 | Ong et al. | |
| 5,766,818 A | 6/1998 | Smith et al. | |
| 5,804,349 A | 9/1998 | Ong et al. | |

(Continued)

FOREIGN PATENT DOCUMENTS

| | | |
|---|---|---|
| EP | 0 463 260 A1 | 1/1992 |
| EP | 1 736 514 A1 | 12/2006 |
| GB | 1442835 | 7/1976 |
| GB | 2 238 792 A | 6/1991 |
| JP | A-2002-285058 | 10/2002 |
| JP | A-2005-238342 | 9/2005 |
| JP | A-2007-23168 | 2/2007 |
| JP | A-2007-23169 | 2/2007 |
| WO | WO 94/11446 | 5/1994 |
| WO | WO 2004/048482 | 6/2004 |

(Continued)

OTHER PUBLICATIONS

Office Action for corresponding Canadian Patent Application No. 2,680,954, mailed on May 9, 2011.
Jun. 9, 2011 Office Action issued in U.S. Appl. No. 12/246,175.
May 12, 2010 Office Action issued in U.S. Appl. No. 12/245,824.
Jun. 29, 2010 Advisory Action issued in U.S. Appl. No. 12/245,824.
Jun. 24, 2011 Office Action issued in U.S. Appl. No. 12/245,782.

(Continued)

*Primary Examiner* — Emily Le
*Assistant Examiner* — Lynne Edmondson
(74) *Attorney, Agent, or Firm* — Oliff & Berridge, PLC

(57) ABSTRACT

A nanoscale pigment particle composition includes a fluorescent compound, such as a benzothioxanthene pigment, including at least one functional moiety, and a stabilizer compound including at least one functional group, wherein the functional moiety associates non-covalently with the functional group; and the presence of the associated stabilizer limits the extent of particle growth and aggregation, to afford nanoscale-sized particles.

19 Claims, No Drawings

U.S. PATENT DOCUMENTS

| | | | |
|---|---|---|---|
| 5,827,633 A | 10/1998 | Ong et al. | |
| 5,840,462 A | 11/1998 | Foucher et al. | |
| 5,853,943 A | 12/1998 | Cheng et al. | |
| 5,853,944 A | 12/1998 | Foucher et al. | |
| 5,869,215 A | 2/1999 | Ong et al. | |
| 5,869,216 A | 2/1999 | Ong et al. | |
| 5,869,558 A | 2/1999 | Hou | |
| 5,916,725 A | 6/1999 | Patel et al. | |
| 5,928,830 A | 7/1999 | Cheng et al. | |
| 5,945,245 A | 8/1999 | Mychajlowskij et al. | |
| 6,103,006 A * | 8/2000 | DiPietro | 106/493 |
| 6,120,967 A | 9/2000 | Hopper et al. | |
| 6,130,021 A | 10/2000 | Patel et al. | |
| 6,174,937 B1 | 1/2001 | Banning et al. | |
| 6,268,222 B1 | 7/2001 | Chandler et al. | |
| 6,294,306 B1 | 9/2001 | Kmiecik-Lawrynowicz et al. | |
| 6,309,787 B1 | 10/2001 | Cheng | |
| 6,399,713 B1 | 6/2002 | MacQueen et al. | |
| 6,413,692 B1 | 7/2002 | Cheng | |
| 6,447,974 B1 | 9/2002 | Chen et al. | |
| 6,458,501 B1 | 10/2002 | Cheng et al. | |
| 6,492,458 B1 | 12/2002 | Pavlin | |
| 6,537,364 B2 | 3/2003 | Dietz et al. | |
| 6,547,380 B2 | 4/2003 | Smith et al. | |
| 6,837,918 B2 | 1/2005 | Pozarnsky et al. | |
| 6,860,930 B2 | 3/2005 | Wu et al. | |
| 6,867,251 B2 | 3/2005 | Wang et al. | |
| 6,870,011 B2 | 3/2005 | MacQueen et al. | |
| 6,902,613 B2 | 6/2005 | Bäbler | |
| 6,906,118 B2 | 6/2005 | Goodbrand et al. | |
| 7,037,633 B2 | 5/2006 | Hopper et al. | |
| 7,160,380 B2 | 1/2007 | Maeta et al. | |
| 7,270,408 B2 | 9/2007 | Odell et al. | |
| 7,293,868 B2 | 11/2007 | Odell et al. | |
| 7,427,323 B1 * | 9/2008 | Birau et al. | 106/497 |
| 7,649,026 B2 | 1/2010 | Allen et al. | |
| 7,834,072 B2 | 11/2010 | Carlini et al. | |
| 7,897,653 B2 | 3/2011 | Iftime et al. | |
| 2002/0131941 A1 | 9/2002 | Habeck et al. | |
| 2003/0055178 A1 | 3/2003 | Gore et al. | |
| 2003/0199608 A1 | 10/2003 | Kamigaki et al. | |
| 2004/0063848 A1 * | 4/2004 | Olson et al. | 524/556 |
| 2004/0261657 A1 | 12/2004 | Wu et al. | |
| 2005/0075453 A1 | 4/2005 | Mathauer et al. | |
| 2005/0186443 A1 | 8/2005 | Marrocco, III et al. | |
| 2006/0063873 A1 | 3/2006 | Lin et al. | |
| 2006/0144290 A1 | 7/2006 | Polk et al. | |
| 2006/0158491 A1 | 7/2006 | Belelie et al. | |
| 2006/0158492 A1 | 7/2006 | Odell et al. | |
| 2006/0159850 A1 | 7/2006 | Breton et al. | |
| 2006/0240353 A1 | 10/2006 | Matsumura et al. | |
| 2006/0293409 A1 | 12/2006 | Sanchez et al. | |
| 2007/0012221 A1 | 1/2007 | Maeta et al. | |
| 2007/0020542 A1 | 1/2007 | Patel | |
| 2007/0082980 A1 | 4/2007 | Lai et al. | |
| 2007/0120921 A1 | 5/2007 | Carlini et al. | |
| 2007/0120924 A1 | 5/2007 | Odell et al. | |
| 2008/0087190 A1 | 4/2008 | Iftime et al. | |
| 2008/0090928 A1 | 4/2008 | Iftime et al. | |
| 2008/0182193 A1 | 7/2008 | Agur et al. | |
| 2008/0302272 A1 | 12/2008 | Allen et al. | |
| 2008/0306189 A1 | 12/2008 | Carlini et al. | |
| 2008/0306193 A1 | 12/2008 | Allen et al. | |
| 2009/0155712 A1 | 6/2009 | Sacripante et al. | |
| 2009/0214972 A1 | 8/2009 | Wosnick et al. | |
| 2010/0086683 A1 * | 4/2010 | Birau et al. | 427/256 |

FOREIGN PATENT DOCUMENTS

| | | |
|---|---|---|
| WO | WO 2006/005521 | 1/2006 |
| WO | WO 2006/005536 | 1/2006 |
| WO | WO 2006/011467 | 2/2006 |
| WO | WO 2006/024103 | 3/2006 |
| WO | WO 2006/132443 | 12/2006 |
| WO | WO 2009/126388 A1 | 10/2009 |

OTHER PUBLICATIONS

May 28, 2009 Office Action issued in U.S. Appl. No. 12/245,824.
Nov. 20, 2009 Office Action issued in U.S. Appl. No. 12/245,824.
Nov. 16, 2009 Search Report issued in 09171060.8.
Nov. 10, 2011 Office Action issued in U.S. Appl. No. 12/245,820.
Oct. 14, 2011 Office Action issued in U.S. Appl. No. 12/245,782.
Sep. 29, 2011 Office Action issued in U.S. Appl. No. 12/246,175.
U.S. Appl. No. 12/245,824, filed Oct. 6, 2008, Maria Birau et al.
U.S. Appl. No. 12/245,820, filed Oct. 6, 2008, Gabriel Iftime et al.
U.S. Appl. No. 12/245,782, filed Oct. 6, 2008, Gabriel Iftime et al.
U.S. Appl. No. 12/246,175, filed Oct. 6, 2008, Gabriel Iftime et al.

* cited by examiner

FLUORESCENT NANOSCALE PARTICLES

TECHNICAL FIELD

This disclosure is generally directed to nanoscale fluorescent pigment particles, and methods for producing such nanoscale fluorescent pigment particles, as well as to uses of such compositions, for example, in ink compositions. Such particles are useful, for example, as nanoscopic colorants for such compositions as inks and the like, such as inkjet ink compositions, phase change ink compositions, and non-aqueous liquid ink compositions.

RELATED APPLICATIONS

Disclosed in commonly assigned U.S. patent application Ser. No. 11/759,906 filed Jun. 7, 2007, is a nanoscale pigment particle composition, comprising: a quinacridone pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized particles. Also disclosed is a process for preparing nanoscale quinacridone pigment particles, comprising: preparing a first solution comprising: (a) a crude quinacridone pigment including at least one functional moiety and (b) a liquid medium; preparing a second solution comprising: (a) a sterically bulky stabilizer compound having one or more functional groups that associate non-covalently with the functional moiety, and (b) a liquid medium; combining the first solution into the second solution to form a third solution and effecting a reconstitution process which forms a quinacridone pigment composition wherein the functional moiety of the pigment associates non-covalently with the functional group of the stabilizer and having nanoscale particle size. Still further is disclosed a process for preparing nanoscale quinacridone pigment particles, comprising: preparing a first solution comprising a quinacridone pigment including at least one functional moiety in an acid; preparing a second solution comprising an organic medium and a sterically bulky stabilizer compound having one or more functional groups that associate non-covalently with the functional moiety of the pigment; treating the second solution containing with the first solution; and precipitating quinacridone pigment particles from the first solution, wherein the functional moiety associates non-covalently with the functional group and the quinacridone pigment particles have a nanoscale particle size.

Disclosed in commonly assigned U.S. patent application Ser. No. 11/759,913 filed Jun. 7, 2007, is a nanoscale pigment particle composition, comprising: an organic monoazo laked pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized pigment particles. Also disclosed is a process for preparing nanoscale-sized monoazo laked pigment particles, comprising: preparing a first reaction mixture comprising: (a) a diazonium salt including at least one functional moiety as a first precursor to the laked pigment and (b) a liquid medium containing diazotizing agents generated in situ from nitrous acid derivatives; and preparing a second reaction mixture comprising: (a) a coupling agent including at least one functional moiety as a second precursor to the laked pigment and (b) a sterically bulky stabilizer compound having one or more functional groups that associate non-covalently with the coupling agent; and (c) a liquid medium combining the first reaction mixture into the second reaction mixture to form a third solution and effecting a direct coupling reaction which forms a monoazo laked pigment composition wherein the functional moiety associates non-covalently with the functional group and having nanoscale particle size. Further disclosed is a process for preparing nanoscale monoazo laked pigment particles, comprising: providing a monoazo precursor dye to the monoazo laked pigment that includes at least one functional moiety; subjecting the monoazo precursor dye to an ion exchange reaction with a cation salt in the presence of a sterically bulky stabilizer compound having one or more functional groups; and precipitating the monoazo laked pigment as nanoscale particles, wherein the functional moiety of the pigment associates non-covalently with the functional group of the stabilizer and having nanoscale particle size.

Commonly assigned, U.S. patent application Ser. No. 11/187,007, filed Jul. 22, 2005, describes a toner comprising particles of a resin, a colorant, an optional wax, and a polyion coagulant, wherein said toner is prepared by an emulsion aggregation process.

Commonly assigned, U.S. patent application Ser. No. 10/606,298, filed Jun. 25, 2003, which has matured into U.S. Pat. No. 7,037,633, describes a toner process comprised of a first heating of a mixture of an aqueous colorant dispersion, an aqueous latex emulsion, and an aqueous wax dispersion in the presence of a coagulant to provide aggregates, adding a base followed by adding an organic sequestering agent, and thereafter accomplishing a second heating, and wherein said first heating is below the latex polymer glass transition temperature (Tg), and said second heating is above about the latex polymer Tg.

Commonly assigned, U.S. patent application Ser. No. 11/626,977, filed Jan. 25, 2007, describes a polyester resin emulsion comprising crosslinked polyester resin in an emulsion medium, the crosslinked polyester resin having a degree of crosslinking of from about 0.1% to about 100%.

Commonly assigned, U.S. patent application Ser. No. 11/548,774, filed Oct. 12, 2006, describes an ink set comprised of at least one radiation curable fluorescent ink comprising at least one curable monomer or oligomer, optionally at least one photoinitiator, and at least one fluorescent material, wherein upon exposure to activating energy, the fluorescent material fluoresces to cause a visible change in the appearance of the ink.

Commonly assigned, U.S. patent application Ser. No. 11/548,775, filed Oct. 12, 2006, describes an ink set comprised of at least one fluorescent phase change ink comprising at least one fluorescent material, wherein upon exposure to activating energy, the fluorescent material fluoresces to cause a visible change in the appearance of the ink.

The appropriate components, for example, waxes, coagulants, resin latexes, surfactants, and colorants, and processes of the above copending applications and patents may be selected for the present disclosure in embodiments thereof. The entire disclosures of the above-mentioned applications are totally incorporated herein by reference.

REFERENCES

Suitable polymer matrices for commercially available fluorescent particles include polymers made from polycondensation of p-toluene-sulfonamide with melamine formaldehyde resins as described in U.S. Pat. Nos. 2,938,873; 2,809,954; and 5,728,797.

Polyamides matrices are described resulting from condensation of a diamine with a diacid (U.S. Pat. No. 5,094,777) or from polycarboxilic acid with aminoalcohols (U.S. Pat. No. 4,975,220), polyesters (U.S. Pat. No. 5,264,153) or copolymers of ethylene carbon monoxide (U.S. Pat. No. 5,439,971) are described.

Hu et. al. describe nanocolorants (dye dissolved in crosslinked polymer nanoparticles) fabricated by a miniemulsion polymerization process of a monomer in presence of a crosslinking agent. (Z. Hu, et. al., Dyes and Pigments 76 (2008) 173-178).

A number of fluorescent particles of a size less than 200 nm are made by the so-called staining method in order to avoid surface functionalization to provide particles that are robust against thermal or chemical degradation. U.S. Pat. No. 4,714, 682 describes a method of calibrating a flow cytometer or fluorescent microscope based on a set of highly uniform microbeads (with diameter of less than 5 microns) associated with a fluorescent dye; EP 1736514 describes fluorescent nanoparticles having a diameter between about 30 nm and about 100 nm.

U.S. Pat. No. 5,073,498 describes a staining process in which swelling is performed on polymer microparticles made of polystyrene in the presence of a fluorescent dye; this process provides particles containing fluorescent dye essentially on the surface, not uniformly distributed within the particles.

U.S. Pat. No. 6,268,222 describes large microparticles (several microns) having surface fluorescent nanoparticles made by a staining method. With respect to the nanoparticles component, dye present only on the surface does not provide stability against thermal, light or chemical agents.

Active Motif Chromeon (Germany) and Sigma-Aldrich (Fluka) produce water dispersible fluorescent nanoparticles (less than 100 nm) usable for biological assays.

U.S. Pat. Nos. 3,455,856 and 3,642,650 describe methods of producing liquid-based inks having fluorescent particles less than 1 μm. The particles are dispersible in water, but not in organic solvents. No particle functionalization process is described and the particles (alkyd resins copolymerized with melamine formaldehyde) are not dispersible in organic solvents.

U.S. Pat. No. 5,294,664 describes water dispersible particles "not greater than 1 micron" obtained by emulsion polymerization of polystyrene incorporating fluorescent dye. The particles are not robust and are not dispersible in organic solvents.

BACKGROUND

Dyes have typically been the colorants of choice for inkjet printing inks because they are readily soluble colorants and, more importantly, do not hinder the reliable jetting of the ink. Dyes have also offered superior and brilliant color quality with an expansive color gamut for inks, when compared with conventional pigments. However, because dyes are molecularly dissolved in the ink vehicle, they are often susceptible to unwanted interactions that lead to poor ink performance, for example photooxidation from light (will lead to poor lightfastness), dye diffusion from the ink into paper or other substrates (will lead to poor image quality and showthrough), and the ability for the dye to leach into another solvent that makes contact with the image (will lead to poor water/solvent fastness). Generally, pigments are considered the better alternative as colorants for inkjet printing inks because they are insoluble and cannot be molecularly dissolved within the ink matrix, and therefore do not experience colorant diffusion. Pigments may also be significantly less expensive than dyes, and so are attractive colorants for use in all printing inks.

Fluorescent inks and toners are among the most widely used security printing features. A printed document is usually authenticated by detecting the light emitted by the fluorescent component when subjected to black light. The light emitting property cannot be reproduced in a second-generation copy.

Fluorescent dyes used in fluorescent inks and toners can lose fluorescence in the print-head when the ink is heated to a temperature greater than 120° C. to melt during normal operation. To overcome this problem, the security printing industry uses hard, robust pigments containing the dye of interest. Pigments are preferred over fluorescent dyes because of their improved chemical, light fastening and thermal stability. Pigments are also preferred by the industry because there is limited or no migration or bleeding of the dye compound.

Most commercially available fluorescent pigments are made by grinding a bulk polymer matrix containing fluorescent materials. This process results in fluorescent particles of a size larger than 1-2 μm, and typically, the size of these particles is about 4-5 μm. According to this process, fluorescent dyes are incorporated into hard, crosslinked particles, thereby limiting the mobility of the fluorescent dye. Once the fluorescent dye is isolated from interaction with other materials present in the ink and, chemical degradation by the environment is diminished. These hard particles are dispersed in the marking material, typically liquid inks.

Key issues precluding pigment particle use for inkjet inks are their large particle sizes and wide particle size distribution, the combination of which can pose critical problems with reliable jetting of the ink (i.e. inkjet nozzles are easily blocked). Pigments are obtained as large aggregates of crystals and with wide distribution of aggregate sizes. The color characteristics of the pigment aggregate can vary widely depending on the aggregate size and crystal morphology. Thus, an ideal colorant that is widely applicable in, for example, inks and toners, is one that possesses the best properties of both dyes and pigments, namely: 1) superior coloristic properties (large color gamut, brilliance, hues, vivid color); 2) color stability and durability (thermal, light, chemical and air-stable colorants); 3) minimal or no colorant migration; 4) processable colorants (easy to disperse and stabilize in a matrix); and 5) inexpensive material cost. Thus, there is a need addressed by embodiments of the present invention, for smaller nano-sized pigment particles that minimize or avoid the problems associated with conventional larger-sized pigment particles. There further remains a need for processes for making and using such improved nano-sized fluorescent pigment particles as colorant materials. The present nano-sized fluorescent pigment particles are useful in, for example, paints, coatings and inks (e.g., inkjet printing inks) and other compositions where pigments can be used such as plastics, optoelectronic imaging components, photographic components, and cosmetics among others.

The following documents provide further background information:

U.S. Pat. No. 6,902,613 discloses a mixture of an organic nanosize pigment comprising of from 50 to 99% by weight of the nanosize pigment and 1 to 50% by weight based of a low molecular weight naphthalene sulfonic acid formaldehyde polymer and its use as a particle growth and crystal phase director for the preparation of a direct pigmentary organic pigment or in pigment finishing.

WO 2004/048482 discloses a mixture of an organic nanosize pigment comprising of from 50 to 99% by weight of the nanosize pigment and 1 to 50% by weight based of a low molecular weight polysulfonated hydrocarbon, in particular naphthalene mono- or disulfonic acid formaldehyde polymer, and its use as a particle growth and crystal phase director for the preparation of a direct pigmentary organic pigment or in pigment finishing.

U.S. Patent Application Publication No. 2006/0063873 discloses a process for preparing nano water paint comprising the steps of: A. modifying the chemical property on the surface of nano particles by hydroxylation for forming hydroxyl groups at high density on the surface of the nano particles; B. forming self-assembly monolayers of low surface energy compounds on the nano particles by substituting the self-assembly monolayers for the hydroxyl groups on the nano particles for disintegrating the clusters of nano particles and for forming the self-assembly monolayers homogeneously on the surface of the nano particles; and C. blending or mixing the nano particles having self-assembly monolayers formed thereon with organic paint to form nano water paint.

U.S. Pat. No. 7,160,380 describes a method of producing a fine particle of an organic pigment, containing the steps of: flowing a solution of an organic pigment dissolved in an alkaline or acidic aqueous medium, through a channel which provides a laminar flow; and changing a pH of the solution in the course of the laminar flow.

There is a need in the art for fluorescent compositions, including fluorescent pigment particles that can be used in/with inkjet, solid ink, UV curable inks and EA toners and that have suitable thermal degradation properties. There is a further need for fluorescent compositions of such small size that can be used in/with inkjet, solid ink, UV curable inks and EA toners and are compatible with organic based marking materials.

SUMMARY

The present disclosure addresses these and other needs, by providing nanoscale fluorescent pigment particles, and methods for producing such nanoscale pigment particles.

In an embodiment, the disclosure provides nanoscale fluorescent pigment particle compositions, comprising:

a fluorescent compound including at least one functional moiety, and a stabilizer compound including at least one functional group, wherein the functional moiety associates non-covalently with the functional group and the presence of the associated stabilizer limits the extent of particle growth and aggregation, to afford nanoscale-sized particles.

In another embodiment, the disclosure provides for a process for preparing nanoscale fluorescent pigment particles, comprising:

preparing a solution comprising a fluorescent pigment including at least one functional moiety in an acid;

preparing a second solution comprising an organic medium and a stabilizer compound having one or more functional groups that associate non-covalently with the functional moiety of the pigment;

treating the second solution containing the stabilizer with the first solution; and precipitating fluorescent pigment particles from the first solution, wherein the functional moiety associates non-covalently with the functional group and the benzothioxanthene pigment particles have a nanoscale particle size.

In still another embodiment, the disclosure provides a marking composition generally comprising at least the above nanoscale fluorescent pigment particles.

EMBODIMENTS

Embodiments of the present disclosure provide nanoscale fluorescent pigment particles, and methods for producing such nanoscale fluorescent pigment particles. Specific embodiments of the present disclosure are illustrated with nanoscale benzothioxanthene pigment particles, and methods for producing such nanoscale benzothioxanthene pigment particles.

The term "average particle diameter" as used herein refers to the average length of the pigment particle as derived from images of the particles generated by Transmission Electron Microscopy (TEM).

The term "average aspect ratio" as used herein refers to the average ratio of the length divided by the width (length: width) of the pigment particle as derived from images of the particles generated by TEM.

The term "substantially colorless" as used herein refers to the transparency of the nanoscale fluorescent particles dispersed in a solvent. Specifically, the nanoscale fluorescent particles are substantially colorless when a substantial portion of the individual nanoscale fluorescent particles dispersed in a solvent are undetectable upon visual inspection.

The term "nanoscale" as used herein refers to pigment particles having a maximum length of less than or equal to about $5 \times 10^2$ nm in addition to a maximum width of less than or equal to about $1 \times 10^2$ nm.

Commercial pigments, having typical median particle sizes of at least about 100 nm to about 1 µm, have both varied particle size distributions and particle aspect ratios. The aspect ratio of a particle relates its length dimension to its width dimension. Generally, the aspect ratio of a particle increases with its length dimension and, frequently, produces acicular and/or irregular morphologies that can include ellipsoids, rods, platelets, needles, and the like. Typically, organic pigments such as, for example, benzothioxanthene pigments have large particle size distribution as well as large distribution of particle aspect ratios and, potentially, a large distribution of particle morphologies. This scenario is undesirable because, apart from clogging the nozzle of the marking apparatus, it can lead to non-dispersed, phase-segregated inks or dispersions and the like made from such pigments having a large distribution of particle size and/or aspect ratio.

Benzothioxanthene pigment particles, when properly synthesized using exemplary conditions and stabilizers outlined here in the embodiments, will have a more regular distribution of nanoscale particle sizes and particle aspect ratio (length width), the latter being about less than 5:1 to about 1:1 with the average particle length of less than about 500 nm, such as less than about 150 nm, or less than about 100 nm as measured in TEM images; and the average particle width of less than about 100 nm, such as less than about 30 nm, or less than about 20 nm, as measured in TEM images.

An advantage of the processes and compositions of the disclosure is that they provide the ability to tune particle size and composition for the intended end use application of the benzothioxanthene pigment. In embodiments, as both the particle size and particle size distribution of pigment particles decreases, the more transparent the particles become. Preferably, this leads to an overall higher color purity of the pigment particles when they are dispersed onto various media via from being coated, sprayed, jetted, extruded, etc.

A steric stabilizer can have the potential to associate itself with the pigment's and/or the pigment precursor's functional moieties via, for example, hydrogen bonding, van der Waals forces, and aromatic pi-stacking such that a controlled crystallization of nanopigment particles occurs. That is, the steric stabilizer provides a functional group that is a complementary part to the functional moiety of the pigment and/or the pigment precursor. The term "complementary" as used in the phrase "complementary functional moiety of the stabilizer"

indicates that the complementary functional moiety is capable of non-covalent chemical bonding such as "hydrogen bonding" with the functional moiety of the organic pigment and/or the functional moiety of the pigment precursor. The steric stabilizer loading in the reaction can vary between 5 to about 300 mol %, such as about 10 to 150% mol or about 20 to 70% mol to pigment The functional moiety of the organic pigment/pigment precursor can be any suitable moiety capable of non-covalent bonding with the complementary functional moiety of the stabilizer. For the pigment, illustrative functional moieties include, but are not limited to, the following: carbonyl groups (C=O); various sulfur containing groups, for example, sulfides, sulfones, sulfoxides, and the like; and substituted amino groups. For the pigment precursor, functional moieties include, but are not limited to, carboxylic acid groups (COOH), ester groups (COOR, where R is any hydrocarbon), anhydride groups, and amide groups.

Representative precursors include substituted naphthalene anhydrides and anilines, as indicated in Scheme 1 below. The functional moieties $R_1$, $R_2$, $R_3$, $R_4$, $R_5$, $R_6$, $R_7$, $R_8$ may be present at any position on the naphthalene and aniline aromatic ring such as ortho, meta or para; they can be different or identical with each other and include, but are not limited to, any combination of the following functional groups: H, methyl, methoxy and carbonyl.

The pigment is prepared according to Scheme 1.

Scheme 1. Synthesis of benzo[k,l] thioxanthene-3,4-dicarboxylic anyhdride

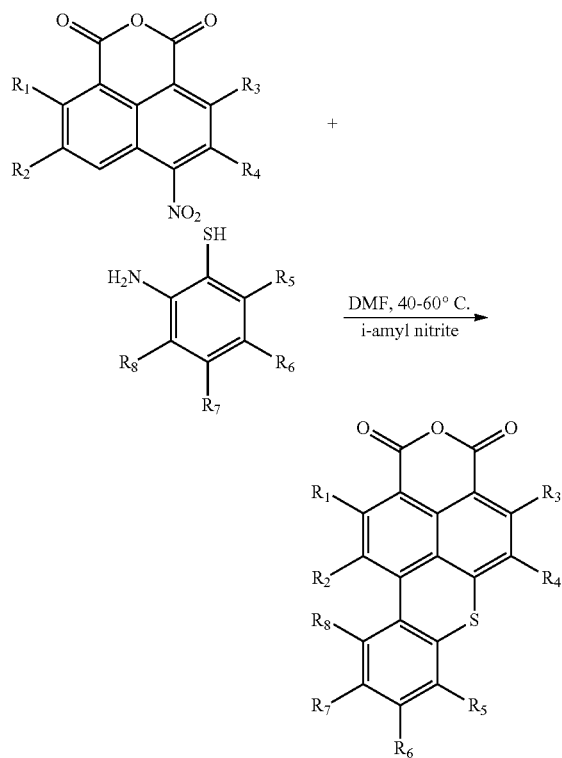

Illustrative examples of such functional moieties include: $R_1=R_2=R_3=R_4=R_5=R_6=R_7=R_8=H$, any alkyl, any aryl; $R_1=CH_3$, any alkyl, any aryl, O-alkyl, O-aryl, CH=O, $R_2=R_3=R_4=R_5=R_6=R_7=R_8=H$; $R_2=CH_3$, any alkyl, any aryl, O-alkyl, O-aryl, CH=O, $R_1=R_3=R_4=R_5=R_6=R_7=R_8=H$; $R_3=CH_3$, any alkyl, any aryl, O-alkyl, O-aryl, CH=O, $R_1=R_2=R_4=R_5=R_6=R_7=R_8=H$; $R_4=CH_3$, any alkyl, any aryl, O-alkyl, O-aryl, CH=O, $R_1=R_2=R_3=R_5=R_6=R_7=R_8=H$; $R_5=CH_3$, any alkyl, any aryl, O-alkyl, O-aryl, $R_1=R_2=R_3=R_4=R_6=R_7=R_8=H$; $R_6=CH_3$, any alkyl, any aryl, O-alkyl, O-aryl, $R_1=R_2=R_3=R_4=R_5=R_7=R_8=H$; $R_7=CH_3$, any alkyl, any aryl, O-alkyl, O-aryl, $R_1=R_2=R_3=R_4=R_5=R_6=R_8=H$; $R_8=CH_3$, any alkyl, any aryl, O-alkyl, O-aryl, $R_1=R_2=R_3=R_4=R_5=R_6=R_7=H$; $R_1=R_2=CH_3$, any alkyl, any aryl, O-alkyl, O-aryl, CH=O, $R_3=R_4=R_5=R_6=R_7=R_8=H$; $R_1=R_4=CH_3$, any alkyl, any aryl, O-alkyl, O-aryl, CH=O, $R_3=R_2=R_5=R_6=R_7=R_8=H$; $R_1=R_3=CH_3$, any alkyl, any aryl, O-alkyl, O-aryl, CH=O, $R_4=R_2=R_5=R_6=R_7=R_8=H$; $R_2=R_3=CH_3$, any alkyl, any aryl, O-alkyl, O-aryl, CH=O, $R_1=R_4=R_5=R_6=R_7=R_8=H$; $R_3=R_4=CH_3$, any alkyl, any aryl, O-alkyl, O-aryl, CH=O, $R_1=R_2=R_5=R_6=R_7=R_8=H$; $R_1=R_2=R_3=CH_3$, any alkyl, any aryl, O-alkyl, O-aryl, CH=O, $R_4=R_5=R_6=R_7=R_8=H$; $R_1=R_3=R_4=CH_3$, any alkyl, any aryl, O-alkyl, O-aryl, CH=O, $R_2=R_5=R_6=R_7=R_8=H$; $R_1=R_2=R_3=R_4=CH_3$, any alkyl, any aryl, O-alkyl, O-aryl, CH=O, $R_5=R_6=R_7=R_8=H$; $R_1=R_2=R_3=R_4=CH_3$, any alkyl, any aryl, O-alkyl, O-aryl, CH=O, $R_5=CH_3$, any alkyl, any aryl, O-alkyl, O-aryl, $R_6=R_7=R_8=H$; $R_1=R_2=R_3=R_4=CH_3$, any alkyl, any aryl, O-alkyl, O-aryl, CH=O, $R_6=CH_3$, any alkyl, any aryl, O-alkyl, O-aryl, $R_5=R_7=R_8=H$; $R_1=R_2=R_3=R_4=CH_3$, any alkyl, any aryl, O-alkyl, O-aryl, CH=O; $R_7=CH_3$, any alkyl, any aryl, O-alkyl, O-aryl, $R_5=R_6=R_8=H$; and $R_1=R_2=R_3=R_4=CH_3$, any alkyl, any aryl, O-alkyl, O-aryl, CH=O, $R_8=CH_3$, any alkyl, any aryl, O-alkyl, O-aryl, $R_5=R_6=R_7=H$.

The complementary functional moiety of the stabilizer can be any suitable moiety capable of non-covalent bonding with the functional moiety of the stabilizer. Illustrative compounds containing complementary functional moieties include, but are not limited to, the following classes: beta-amino carboxylic acids and their esters containing large aromatic moieties such as phenyl, benzyl, naphthyl and the like, long linear or branched aliphatic chains such as having about 5 to about 20 carbons such as pentyl, hexyl, heptyl, octyl, nonyl, decyl, undecyl and the like; beta-hydroxy carboxylic acids and their esters containing long linear, cyclic or branched aliphatic chains such as having 5 to about 20 carbons such as pentyl, hexyl, cyclohexyl, heptyl, octyl, nonyl, decyl, undecyl and the like; sorbitol esters with long chain aliphatic carboxylic acids such as lauric acid, oleic acid, palmitic acid, stearic acid; polymeric compounds such as polyvinylpyrrolidone, poly(1-vinylpyrrolidone)-graft-(1-hexadecene), poly(1-vinylpyrrolidone)-graft-(1-triacontene), and poly(1-vinylpyrrolidone-co-acrylic acid).

The sterically bulky group of the stabilizer can be any suitable moiety that limits the extent of particle self-assembly to nanosized particles. It is understood that "sterically bulky group" is a relative term requiring comparison with the size of the precursor/pigment; a particular group may or may not be "sterically bulky" depending on the relative size between the particular group and the precursor/pigment. As used herein, the phrase "sterically bulky" refers to the spatial arrangement of a large group attached to a molecule.

Representative stabilizers to enable nanosized particles include but are not limited to, the following: mono and tri-esters of sorbitol (SPAN®'s) with palmitic acid (SPAN® 40), stearic acid (SPAN® 60) and oleic acid (SPAN® 85) where the aliphatic chain of the acid is considered sterically bulky; tartaric acid esters with cyclohexanol and Isofol 20 where the cyclohexane moiety and the branched chain of Isofol are considered sterically bulky; polymers such as polyvinylpyrrolidone, poly(1-vinylpyrrolidone)-graft-(1-hexadecene), poly(1-vinylpyrrolidone)-graft-(1-triacontene), poly(1-vinylpyrrolidone-co-acrylic acid) where the polymeric chain in itself is considered sterically bulky.

The non-covalent chemical bonding between the functional moiety of the precursor/pigment and the complementary functional moiety of the stabilizer is, for example, afforded by van der Waals' forces, ionic bonding, hydrogen bonding, and/or aromatic pi-stacking bonding. In embodiments, the non-covalent bonding is ionic bonding and/or hydrogen bonding but excluding aromatic pi-stacking bonding. In embodiments, the non-covalent bonding can be predominately hydrogen bonding or can be predominately aromatic pi-stacking bonding, where the term "predominately" indicates in this case the dominant nature of association of the stabilizer with the pigment particle.

In embodiments, for the acid dissolution of the pigment, any suitable agent can be used to completely solubilize the pigment subjecting the solution to conditions, which re-precipitate the solubilized pigment into nano-sized particles. Representative examples include, but are not limited to, sulfuric acid, nitric acid, mono-, di-, and tri-halo acetic acids such as trifluoroacetic acid, dichloroacetic acid and the like, halogen acids such as hydrochloric acid, phosphoric acid and polyphosphoric acid, boric acid, and a variety of mixtures thereof.

Any suitable liquid medium can be used to carry out the re-precipitation of the benzothioxanthene pigment so as to afford nanoscale particles. Examples of suitable liquid media include, but are not limited to, the following organic liquids such as: N-methyl-2-pyrrolidinone, dimethyl sulfoxide, N,N-dimethylformamide, N,N-dimethylacetamide, sulfolane, hexamethylphosphoramide, among others.

Any liquid that will not dissolve the pigment can be used as an optional precipitating agent. Illustrative precipitating agents include, but are not limited to, alcohols such as methanol, ethanol, 1-propanol, 2-propanol, 1-butanol, 2-butanol; water; tetrahydrofuran; ethyl acetate; hydrocarbon solvents such as hexanes, toluene, xylenes, and Isopar solvents; and mixtures thereof.

The steric stabilizer loading in the reaction can vary between about 5 to about 300 mol %, such as about 10 to about 150 mol %, or about 20 to about 70 mol % to pigment. Optionally, the solids concentration of the nanoscale pigment particle in the final precipitated mixture may vary from 0.5% to about 20% by weight such as from about 0.5% to about 10% by weight, or about 0.5% to about 5% by weight, but the actual value can also be outside these ranges.

In an embodiment, the crude benzothioxanthene pigment is first solubilized in an acidic liquid, such as concentrated sulfuric acid, which is then added slowly under vigorous agitation to a second solution comprising a suitable solvent and a steric stabilizer compound, and optionally a minor amount of a surface-active agent or other common additive. During the addition, the temperature is maintained anywhere from about 0° C. to about 40° C., although the re-precipitation of benzothioxanthene pigment to form nanoscale particles can be held isothermally within or outside this temperature range in one embodiment and, in another embodiment, the temperature during re-precipitation of benzothioxanthene pigment to form nanoscale particles can also be allowed to cycle up and down within or outside this temperature range.

In an embodiment, a first solution is prepared or provided that comprises pigment particles dissolved or dispersed in a strong acid. The strong acid may be, for example, a mineral acid, an organic acid, or a mixture thereof. Examples of strong mineral acids include sulfuric acid, nitric acid, perchloric acid, various hydrohalic acids (such as hydrochloric acid, hydrobromic acid, and hydrofluoric acid), fluorosulfonic acid, chlorosulfonic acid, phosphoric acid, polyphosphoric acid, boric acid, mixtures thereof, and the like. Examples of strong organic acids include organic sulfonic acid, such as methanesulfonic acid and toluenesulfonic acid, acetic acid, trifluoroacetic acid, chloroacetic acid, cyanoacetic acid, mixtures thereof, and the like.

This first solution can include the strong acid in any desirable amount or concentration, such as to allow for desired dissolution or dispersion of the pigment particles. The acid solution contains pigment in a concentration of about 0.5% to about 20%, such as about 1% to about 15% or about 2% to about 10% by weight, although the values can also be outside these ranges.

In an embodiment, the second solution is prepared or provided that comprises the steric stabilizer. Suitable steric stabilizers include those described earlier, and can include others such as the surface-active agents described previously that have functional groups that also interact with the functional moieties of the pigment particles to provide additional stabilization. The steric stabilizer may be introduced in the form of a solution, where the steric stabilizer is either dissolved or finely suspended in a suitable liquid medium, such as water or polar organic solvents such as acetone, acetonitrile, ethyl acetate, alcohols such as methanol, ethanol, isopropanol, diethyl ether, tetrahydrofuran, N-methyl-2-pyrrolidinone, dimethyl sulfoxide, N,N-dimethylformamide, mixtures thereof and the like. For example, a suitable liquid medium in an embodiment is a mixture of water and N-methyl-2-pyrrolidinone. Such mixtures may contain water and N-methylpyrrolidinone in a ratio of about 1:6 to about 1:3, such as about 1:4.

In an embodiment, a precipitating agent, such as those described above, can also be incorporated into the second solution. Precipitating agents are liquids that do not solubilize the pigment and include, but are not limited to, water, alcohols such as methanol, ethanol and isopropanol and various mixtures thereof. The precipitating agent can be added in a range of about 10% to about 100% by volume out of the total volume of the mixture, such as between about 20% and about 80%, or between about 30% and about 70%.

The re-precipitation of the pigment to form nanoscale pigment particles may be conducted by adding the first (dissolved pigment) solution to the second (steric stabilizer) solution. This addition is conducted slowly by adding the first (dissolved pigment) solution to the second (steric stabilizer) solution under agitation by use of mechanical stirring or homogenization or other means. Methods of addition can include drop-wise from a suitable vessel, or spraying with or without the use of a nebulizing gas.

The re-precipitation process may be conducted at any desired temperature to allow for formation of nanoscale benzothioxanthene pigment particles while maintaining solubility of the first and second solutions. For example, the re-precipitation can be conducted at a temperature of from about 0° to about 90° C., such as from about 0° to about 60° C., or from 0° to about 30° C., although temperatures outside of these ranges can be used. In one embodiment, the re-precipitation can be performed essentially isothermally, where a substantially constant temperature is maintained, while in another embodiment, the temperature during re-precipitation can be allowed to fluctuate within the above range, where the fluctuation can be cyclic or the like.

After addition of the first solution (dissolved pigment) to the second solution, it is believed that a non-covalent bonding interaction occurs between the functional moieties present on the pigment molecules and the functional groups of the steric stabilizer molecules, which creates a steric barrier that limits or prevents further aggregation of the pigment molecules. In this way, the pigment particle size and morphology, can be controlled and even tailored by providing steric stabilizer compositions and process conditions that limit pigment particle growth to a desired level.

Once the re-precipitation is complete, the pigment nanoscale particles may be separated from the solution by any conventional means, such as vacuum-filtration methods or centrifugal separation methods. The nanoscale particles may also be processed for subsequent use according to known methods.

In an embodiment, acid dissolution and reconstitution may be performed utilizing a solution of pigment in, for example, concentrated sulfuric acid and the solution is added slowly with vigorous stirring to a solution of a suitable solvent containing the optimum amount of steric stabilizer. During the addition, the temperature is maintained at about 20° C. to below about 60° C., although the re-precipitation of benzothioxanthene into nanoscale particles can be held isothermally within or outside this temperature range in one embodiment and, in another embodiment, the temperature during re-precipitation of benzothioxanthene into nanoscale particles can also be allowed to cycle up and down within or outside this temperature range.

The formed nanoscale benzothioxanthene pigment particles may be used, for example, as coloring agents in a variety of compositions, such as in liquid (aqueous or non-aqueous) ink vehicles, including inks used in conventional pens, markers, and the like, liquid ink jet ink compositions.

Inkjet ink compositions according to this disclosure generally include a carrier, a colorant, and one or more additional additives. Such additives can include, for example, solvents, waxes, antioxidants, tackifiers, slip aids, curable components such as curable monomers and/or polymers, gellants, initiators, sensitizers, humectants, biocides, preservatives, and the like. Specific types and amounts of components will depend, of course, on the specific type of ink composition, such as liquid, or the like.

Generally, the ink compositions contain one or more colorant. Any desired or effective colorant can be employed in the ink compositions, including pigment, dye, mixtures of pigment and dye, mixtures of pigments, mixtures of dyes, and the like. In embodiments, the colorant used in the ink composition consists entirely of the formed nanoscale benzothioxanthene pigment particles. However, in other embodiments, the nanoscale benzothioxanthene pigment particles can be used in combination with one or more conventional or other colorant material, where the nanoscale benzothioxanthene pigment particles can form substantially most of the colorant material (such as about 90% or about 95% by weight or more), they can form a majority of the colorant material (such as at least 50% by weight or more), or they can form a minority of the colorant material (such as less than about 50% by weight). Two major advantages of using nanoscale pigments over conventional pigments are: 1) to ensure reliable jetting of ink formulations (printhead reliability), and 2) the enhanced coloristic performance of nanoscale pigments will reduce the loading of pigment within the ink composition. In still other embodiments, the nanoscale benzothioxanthene pigment particles can be included in the ink composition in any other varying amount, to provide either colorant and/or other properties to the ink composition.

The ink compositions may also optionally contain an antioxidant. The optional antioxidants of the ink compositions help to protect the images from oxidation and also help to protect the ink components from oxidation during the heating portion of the ink preparation process. Specific examples of suitable antioxidants include NAUGUARD® series of antioxidants, such as NAUGUARD® 445, NAUGUARD® 524, NAUGUARD® 76, and NAUGUARD® 512 (commercially available from Uniroyal Chemical Company, Oxford, Conn.), the IRGANOX® series of antioxidants such as IRGANOX® 1010 (commercially available from Ciba Geigy), and the like. When present, the optional antioxidant can be present in the ink in any desired or effective amount, such as in an amount of from at least about 0.01 to about 20% by weight of the ink, such as about 0.1 to about 5% by weight of the ink, or from about 1 to about 3% by weight of the ink, although the amount can be outside of these ranges.

The ink compositions may also optionally contain a viscosity modifier. Examples of suitable viscosity modifiers include aliphatic ketones, such as stearone, and the like. When present, the optional viscosity modifier can be present in the ink in any desired or effective amount, such as about 0.1 to about 99% by weight of the ink, such as about 1 to about 30% by weight of the ink, or about 10 to about 15% by weight of the ink, although the amount can be outside of these ranges.

The ink composition also includes a carrier material, or mixture of two or more carrier materials. The carrier material may vary, for example, depending upon the specific type of ink composition. For example, an aqueous ink jet ink composition can use water, or a mixture of water and one or more other solvents, as a suitable carrier material. Other ink jet ink compositions can use one or more organic solvents as a carrier material, with or without water.

The ink carrier in a can be present in ink in any desired or effective amount. For example, the carrier can be present in an amount of about 0.1 to about 99% by weight of the ink, such as about 50 to about 98% by weight of the ink, or about 90 to about 95% by weight of the ink, although the amount can be outside of these ranges.

The ink compositions of the present disclosure may also optionally contain other materials, which may depend upon the type of printer in which the ink is used. For example, the carrier composition is typically designed for use in either a direct printing mode or an indirect or offset printing transfer system.

The ink compositions of the present disclosure may be prepared by any desired or suitable method. In the case of liquid ink compositions, the ink ingredients can simply be mixed together with stirring to provide a homogeneous composition, although heating may also be used if desired or necessary to help form the composition.

In addition to ink compositions, the nanoscale fluorescent pigment particles may be used in a variety of other applications, where it is desired to provide a fluorescent color to the composition. For example, the nanoscale benzothioxanthene pigment particles can also be used in the same manner as conventional pigments in such uses as colorants for paints, resins, lenses, filters, printing inks, and the like according to applications thereof.

In embodiments, the nanoscale fluorescent pigment particles may be used in ink compositions which comprise an aqueous liquid vehicle. The liquid vehicle may consist solely of water, or it may comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof.

In other embodiments encompassing non-aqueous inks, the nanoscale fluorescent pigment particles may be applied towards solvent-borne inks such as petroleum-based inks that may include aliphatic hydrocarbons, aromatic hydrocarbons, and mixtures thereof, environmentally friendly soy and vegetable oil-based inks, linseed oil-based inks and other ink-based vehicles derived from natural sources. Other examples of ink vehicles for nanoscale fluorescent pigment particles include isophthalic alkyds, higher order alcohols and the like.

In still other embodiments, the nanoscale fluorescent pigment particles may be applied towards inks used in relief gravure, stencil, and lithographic printing.

In the following examples, all percentages and parts are by weight unless otherwise indicated.

EXAMPLES

Example 1

Synthesis of the Fluorescent Pigment—Benzo[k,l] thioxanthene-3,4-dicarboxylic Anhydride The pigment is prepared according to Scheme 2.

Scheme 2. Synthesis of benzo[k,l] thioxanthene-3,4-dicarboxylic anhydride

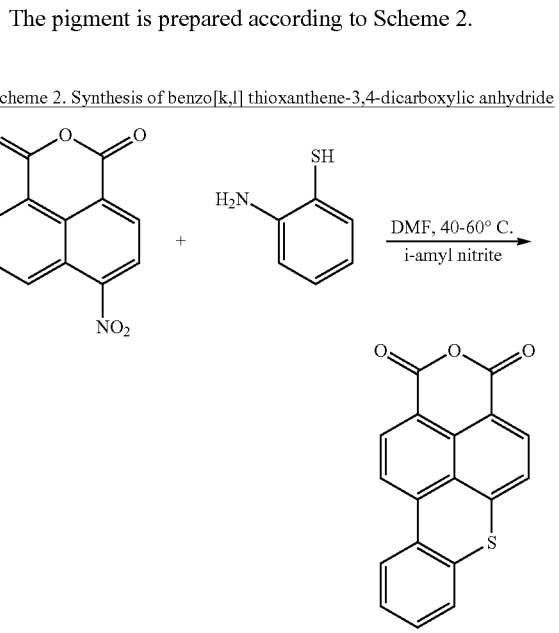

In a 200 mL 3-neck round bottom flask fitted with magnetic stirrer, reflux condenser and oil bath were introduced 4 g (0.016 mol) 4-nitronaphthalene tetracarboxylic anhydride, 3 mL (0.03 mol) 2-amino-benzenethiol and 40 mL N,N-dimethyl formamide. A dark brown solution resulted, I-Amyl nitrite, 3.2 mL (0.024 mol) was added slowly, via a syringe into the flask. The temperature of the reaction mixture rose to 80° C., and an orange precipitate formed. At the end of the addition, the temperature in the flask was allowed to drop to 60° C. The reaction mixture was then stirred at this temperature for 3 hours to insure completion of the reaction. The solid was filtered through a fritted glass and washed with N,N-dimethyl formamide twice, and once with N,N-dimethyl formamide:distilled water with a weight ratio of 1:1 until the washings were clear. The orange solid was dried in a vacuum oven at 100° C. overnight. Infrared Spectrometry using a KBr pellet resulted in the following data: double anhydride C=O peak at 1758 cm$^{-1}$ and 1721 cm$^{-1}$. The average particle size from Transmission Electron Microscopy was greater than 2 μm in length and many of the particles had a particle width greater than 500 nm.

Example 2

Synthesis of Nanoscale Fluorescent Pigment Particles

In a 500 mL resin kettle fitted with mechanical stirring, dropping funnel and ice/water cooling bath were introduced 3000 mL N-methyl-2-pyrrolidinone and 2.6 g (0.006 mol) SPAN 40. To this solution was added dropwise over a period of 15 minutes a solution of 30 mL sulfuric acid containing 0.5 g (0.002 mol) benzothioxanthene and 0.050 g (0.0001 mol) perylene tetracarboxylic dianhydride. During the addition, the temperature in the resin kettle rose to 40° C. At the end of the addition, the reaction mixture was allowed to stir at room temperature for 30 minutes. The thick mixture was diluted with 500 mL isopropanol distilled water with a weight ratio of 2:1. The resulted mixture was filtered using a fritted glass. The pigment was washed on the frit twice with 20 mL isopropanol and once with 20 mL isopropanol. Infrared Spectrometry using a KBr pellet resulted in the following data: double anhydride C=O peak at 1758 cm$^{-1}$ and 1721 cm$^{-1}$. The particle size from Transmission Electron Microscopy (wet cake) was 100-500 nm in length and less than 100 nm width.

Example 2

Formation of Nanoscale Pigment Particles with Oleic Acid

In a 500 mL resin kettle fitted with mechanical stirring, dropping funnel and ice/water cooling bath were introduced 300 mL N-methyl-2-pyrrolidinone and 4.9 g (0.02 mol) oleic acid. To this solution was added dropwise over a period of 15 minutes a solution of 30 mL sulfuric acid containing 0.5 g (0.002 mol) benzothioxanthene and 0.050 g (0.0001 mol) perylene tetracarboxylic dianhydride. During the addition, the temperature in the resin kettle rose to 40° C. At the end of the addition, the reaction mixture was allowed to stir at room temperature for 30 minutes. The thick mixture was diluted with 500 mL isopropanol:distilled water with a weight ratio of 2:1. The resulted mixture was separated using a centrifuge. The pigment particles were washed through centrifugation once with distilled water and once with acetone. Infrared Spectrometry using a KBr pellet resulted in the following data: double anhydride C=O peak at 1758 cm$^{-1}$ and 1721 cm$^{-1}$. The particle size from Transmission Electron Microscopy (wet cake) was 100-500 nm in length and less than 100 nm in width.

Dispersibility Tests in Organic Solvents

Examples 2 and 3 were dispersed successfully in acetone and propanol solvents, providing substantially colorless solutions. Particles prepared from example 2 were dissolved in octonal as a solvent, by sonication. The solvent was filtered through a 1 μm filter to provide a substantially colorless solution. No residue or particles could be observed upon visual examination of the 1 μm filter. The filtered solution emitted bright yellow light under UV light illumination.

Printing Tests

A printing composition was prepared and a diamatrix cartridge was filled with the above solution from Example 2. Preliminary test prints were done with a diamatrix experimental inkjet printer. The fluorescent print revealed illumination under UV light. The text was practically invisible under normal light. Example 2 after printing emitted a yellow-green text when exposed to UV light.

As a comparative example, pigment from Example 1 (with large particles of pigment, as synthesized) was dispersed by the same procedure in octanol. When filtering through a 1 μm filter, an orange-colored residue was retained on the filter indicating that only a small portion of the particles pass through the filter (those which happen to be of small enough size), but most particles remained on the filter. Unlike Example 2, Example 1 was very hard to filter, and while it might be possible to print with the filtered solution of the pigment as synthesized, the process was not economically efficient because filtering excluded a large amount of particles.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A nanoscale particle composition, comprising:
   a benzothioxanthene compound including at least one functional moiety, and
   a stabilizer compound including at least one functional group,
   wherein the functional moiety associates non-covalently with the at least one functional group, and
   wherein the nanoscale-sized particles have an average particle diameter as derived from Transmission Electron Microscopy of less than about 150 nm.

2. The composition of claim 1, wherein the at least one functional group of the stabilizer is a sterically bulky stabilizer selected from the group consisting of beta-amino carboxylic acids and their salts and esters containing at least large aromatic moieties or long linear or branched aliphatic chains; beta-hydroxy carboxylic acids and their esters containing long linear or branched aliphatic chains; sorbitol esters with long chain aliphatic carboxylic acids; and polymeric compounds.

3. The composition of claim 2, wherein the sterically bulky stabilizer is selected from the group consisting of mono and triesters of sorbitol with palmitic acid, stearic acid, or oleic acid; tartaric acid esters with cyclohexanol; and polymers.

4. The composition of claim 3, wherein the non-covalent association between the benzothioxanthene compound and the sterically bulky stabilizer compound is at least one of van der Waals' forces, ionic bonding, coordination bonding, hydrogen bonding, and aromatic pi-stacking bonding.

5. The composition of claim 1, wherein the benzothioxanthene compound has an average aspect ratio (length:width) of from about 1:1 to about 5:1.

6. A process for preparing the nanoscale particle composition of claim 1, comprising:
   preparing a first solution comprising a benzothioxanthene compound including at least one functional moiety in an acid;
   preparing a second solution comprising an organic medium and a stabilizer compound having one or more functional groups that associate non-covalently with the functional moiety of the compound;
   treating the second solution containing with the first solution; and
   precipitating benzothioxanthene compound particles from the first solution, wherein the functional moiety associates non-covalently with the functional group and the benzothioxanthene compound particles have a nanoscale particle size, and
   wherein the nanoscale-sized particles have an average particle diameter as derived from Transmission Electron Microscopy of less than about 150 nm.

7. The process of claim 6, wherein the acid is selected from the group consisting of strong mineral acids and organic acids.

8. A liquid ink composition suitable for ink jet printing, comprising:
   a carrier, and
   a plurality of nanoscale particles, wherein the nanoscale particles have a composition comprising:
     a benzothioxanthene compound including at least one functional moiety, and
     a stabilizer compound including at least one functional group, wherein the functional moiety associates non-covalently with the at least one functional group, and
     wherein the nanoscale-sized particles have an average particle diameter as derived from Transmission Electron Microscopy of less than about 150 nm.

9. The ink composition of claim 8, wherein the plurality of nanoscale particles impart color to the ink composition.

10. The ink composition of claim 8, wherein the plurality of nanoscale particles are substantially colorless.

11. The ink composition of claim 8, wherein the carrier is present in an amount of about 50 to about 99.9 weight % by weight of the ink.

12. The ink composition of claim 8, wherein said benzothioxanthene compound is present in an amount of about 0.1 to about 50 weight % by weight of the ink.

13. The ink composition of claim 8, wherein the stabilizer compound is oleic acid.

14. The ink composition of claim 8, wherein the non-covalent association between the functional moiety and the functional group is at least one of van der Waals' forces, ionic bonding, coordination bonding, hydrogen bonding, and aromatic pi-stacking bonding.

15. The composition of claim 1, wherein the nanoscale-sized particles have an average particle width of less than about 30 nm.

16. The composition of claim 2, wherein the sterically bulky stabilizer is selected from the group consisting of mono and triesters of sorbitol with palmitic acid, stearic acid, or oleic acid.

17. The composition of claim 2, wherein the sterically bulky stabilizer is selected from the group consisting of tartaric acid esters with cyclohexanol; and polymers.

18. The composition of claim 1, wherein the benzothioxanthene compound has the following general formula:

17

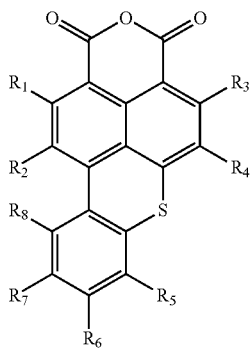

where $R_1, R_2, R_3, R_4, R_5, R_6, R_7,$ and $R_8$ are selected from the following combinations:

- $R_1$ and $R_2$ are independently $CH_3$, an alkyl group, an aryl group, O-alkyl group, O-aryl group, or CH=O, and $R_3, R_4, R_5, R_6, R_7,$ and $R_8$ are H;
- $R_1$ and $R_4$ are independently $CH_3$, an alkyl group, an aryl group, O-alkyl group, O-aryl group, or CH=O, and $R_3, R_2, R_5, R_6, R_7,$ and $R_8$ are H;
- $R_1$ and $R_3$ are independently $CH_3$, an alkyl group, an aryl group, O-alkyl group, O-aryl group, or CH=O, and $R_4, R_2, R_5, R_6, R_7,$ and $R_8$ are H;
- $R_2$ and $R_3$ are independently $CH_3$, an alkyl group, an aryl group, O-alkyl group, O-aryl group, or CH=O, and $R_1, R_4, R_5, R_6, R_7,$ and $R_8$ are H;
- $R_3$ and $R_4$ are independently $CH_3$, an alkyl group, an aryl group, O-alkyl group, O-aryl group, or CH=O, and $R_1, R_2, R_5, R_6, R_7,$ and $R_8$ are H;
- $R_1, R_2,$ and $R_3$ are independently $CH_3$, an alkyl group, an aryl group, O-alkyl group, O-aryl group, CH=O, $R_4, R_5, R_6, R_7, R_8$=H;
- $R_1, R_3,$ and $R_4$ are independently $CH_3$, an alkyl group, an aryl group, O-alkyl group, O-aryl group, CH=O, $R_2, R_5, R_6, R_7,$ and $R_8$ are H; or
- $R_1, R_2, R_3,$ and $R_4$ are independently $CH_3$, an alkyl group, an aryl group, O-alkyl group, O-aryl group, or CH=O, $R_5, R_6, R_7,$ and $R_8$ are H.

19. The composition of claim 1, wherein the benzothioxanthene compound has the following general formula:

18

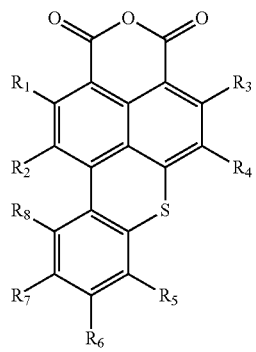

where $R_1, R_2, R_3, R_4, R_5, R_6, R_7,$ and $R_8$ are selected from the following combinations:

- $R_1, R_2, R_3, R_4, R_5, R_6, R_7,$ and $R_8$ are independently H, an alkyl group, or an aryl group;
- $R_1$ is $CH_3$, an alkyl group, an aryl group, O-alkyl group, O-aryl group, or CH=O, and $R_2, R_3, R_4, R_5, R_6, R_7,$ and $R_8$ are H;
- $R_2$ is $CH_3$, an alkyl group, an aryl group, O-alkyl group, O-aryl group, or CH=O, and $R_1, R_3, R_4, R_5, R_6, R_7,$ and $R_8$ are H;
- $R_3$ is $CH_3$, an alkyl group, an aryl group, O-alkyl group, O-aryl group, or CH=O, and $R_1, R_2, R_4, R_5, R_6, R_7,$ and $R_8$ are H;
- $R_4$ is $CH_3$, an alkyl group, an aryl group, O-alkyl group, O-aryl group, or CH=O, and $R_1, R_2, R_3, R_5, R_6, R_7,$ and $R_8$ are H;
- $R_5$ is $CH_3$, an alkyl group, an aryl group, O-alkyl group, or O-aryl group, and $R_1, R_2, R_3, R_4, R_5, R_7,$ and $R_8$ are H;
- $R_6$ is $CH_3$, an alkyl group, an aryl group, O-alkyl group, or O-aryl group, and $R_1, R_2, R_3, R_4, R_5, R_7,$ and $R_8$ are H;
- $R_7$ is $CH_3$, an alkyl group, an aryl group, O-alkyl group, or O-aryl group, and $R_1, R_2, R_3, R_4, R_5, R_6,$ and $R_8$ are H; or
- $R_8$ is $CH_3$, an alkyl group, an aryl group, O-alkyl group, and O-aryl group, and $R_1, R_2, R_3, R_4, R_5, R_6,$ and $R_7$ are H.

\* \* \* \* \*